June 5, 1962          N. BIANCO          3,037,576
VEHICLE SAFETY DEVICE INCLUDING AUTOMATIC STOPPING MECHANISM
Filed April 15, 1960          2 Sheets-Sheet 1
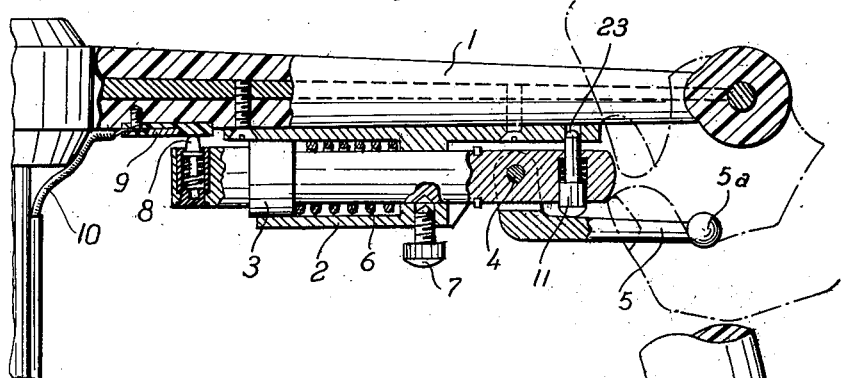
Fig. 1
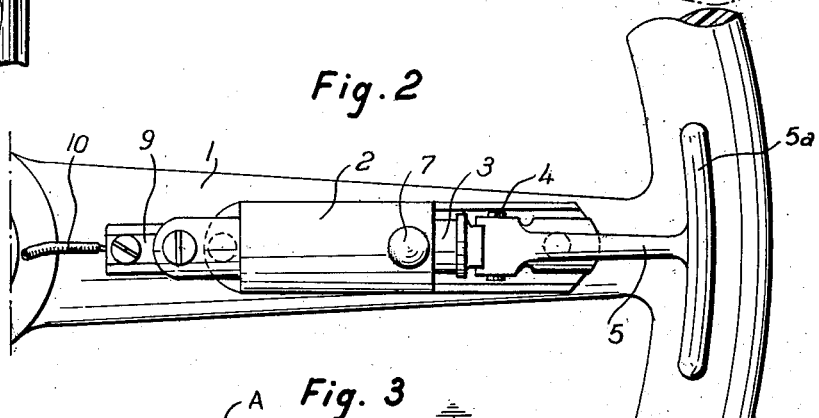
Fig. 2
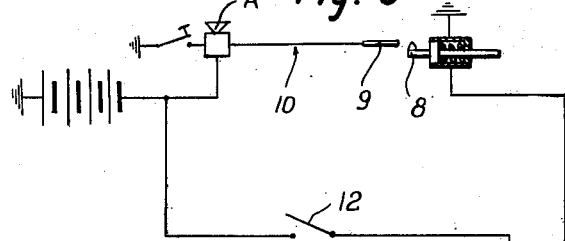
Fig. 3
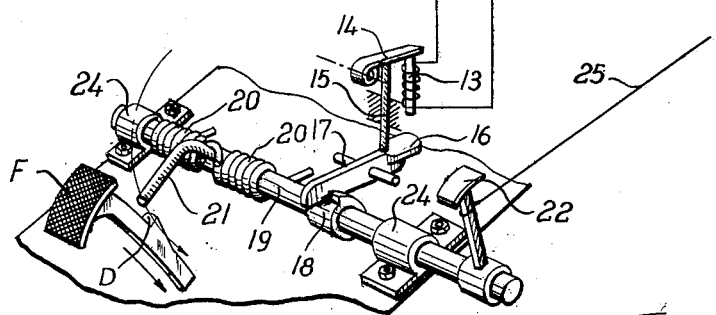
INVENTOR:-
NATALE BIANCO June 5, 1962 N. BIANCO 3,037,576
VEHICLE SAFETY DEVICE INCLUDING AUTOMATIC STOPPING MECHANISM
Filed April 15, 1960 2 Sheets-Sheet 2

INVENTOR:
NATALE BIANCO

United States Patent Office 3,037,576
Patented June 5, 1962

3,037,576
VEHICLE SAFETY DEVICE INCLUDING AUTOMATIC STOPPING MECHANISM
Natale Bianco, 19b Corso Francia, Turin, Italy
Filed Apr. 15, 1960, Ser. No. 22,546
3 Claims. (Cl. 180—82)

The present invention relates to a safety device which comes into operation when drivers of motor vehicles become fatigued and which, in the event of the driver losing control, is capable of causing an acoustic warning to act and of shutting off the engine and braking the vehicle.

The device to which the invention relates comprises a lever which is situated on the steering wheel and which is intended to be gripped and drawn by the driver, with the fingers of one hand, together with the steering wheel, and which operates, under the influence of resilient means, in conjunction with a switch included in the electric circuit of the acoustic warning system. The said switch likewise controls the means for shutting off the engine and for braking the vehicle.

Further characteristics of the invention will emerge from the following detailed description, with reference to the accompanying drawings, which provide a schematic diagram, purely by way of an example and without any limitative effect, of one form in which the invention can be put into practice.

Figure 4:
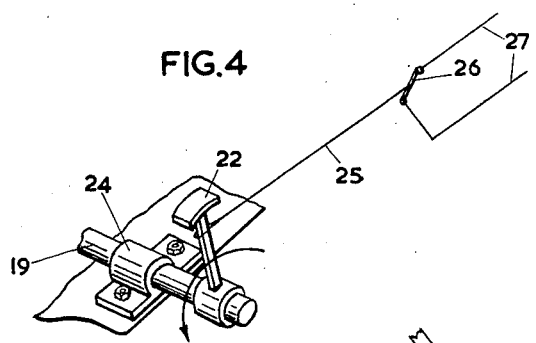
Figure 5:
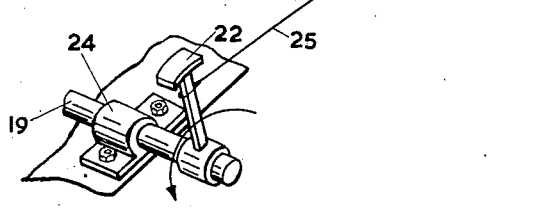

FIG. 1 is a longitudinal section of that part of the device which is applied to the steering wheel; FIG. 2 is an underneath plan view of FIG. 1; FIG. 3 is an electro-mechanical schematic diagram of the device; and FIGS. 4 and 5 show, diagrammatically, how the braking device can also be used for stopping the engine.

The numeral 1 denotes one of the spokes of the steering wheel, to the lower part of which is affixed a metal casing 2 connected to ground via the metallic framework of the steering wheel itself.

Within the casing 2 there is a piston 3, subjected to the action of a spring 6, which tends to displace it in an axial direction. The rear end of the piston 3 bears a transverse bolt 4, around which a lever 5 oscillates, the latter being provided with a cross piece 5a, which is intended to be grasped by the driver with the fingers of one hand, at the same time as the steering wheel.

The piston 3 can be rendered inactive and secured in this position by means of a pressure screw 7 when the device is not required to function. The front of of the piston bears a brush 8, intended to act in conjunction with a fixed contact 9, which is connected, via a conductor 10, to the acoustic warning device A of the motor vehicle. The brush 8, in conjunction with the fixed contact 9, provides the connection to ground for the acoustic warning system.

The lever 5 is controlled by a small piston with a spring 11, which is guided in a transversal direction through the piston 3. When the piston is withdrawn to the rear, the tip of the aforementioned spring-piston 11 can penetrate into an aperture provided in the casing 2, so that the lever 5 can move into its highest position.

When the device is in operation the driver of the motor vehicle grasps the lever 5 and keeps it in contact with the rim of the steering wheel. This position of the lever 5 corresponds to the engagement of the spring-piston 11 in the aperture 23 of the casing, whereby the piston 3 is moved against the action of the spring 6, thus keeping the switch 8—9 open.

The device comes into operation as soon as the driver, overcome by fatigue, releases the lever 5, enabling the spring-piston 11 to disengage itself from the aperture 23 and the spring 6 to bring about an axial displacement of the piston 3. The switch 8—9 then closes, and the acoustic warning device A operates, thus attracting the attention of the driver.

The device also comprises means for shutting off the engine and for braking the vehicle when desired by the driver. These means can be either made ready for operation or rendered inactive by a switch 12 situated on the dashboard.

With reference to the diagram in FIG. 3, the aforesaid switch, marked 12, is included in the electric circuit of an electro-magnet 13, which is excited by the closing of the switch 8—9, situated on the steering wheel and described in the foregoing.

The electro-magnet 13 acts via an oscillating arm 14 and a bar 15 on a lever 16 which is pivoted on a bolt 17. The opposite end of the lever 16 has a tooth which acts in conjunction with a stepped collar 18 keyed onto a shaft 19 of which the bearings 24 are affixed to the frame of the motor vehicle in the vicinity of the foot brake.

The shaft 19 is subjected to the action of torsional springs 20 which tend to control its oscillation, and it has a crank 21 of which the purpose is to act on a tooth D provided in the leg of a brake control member such as the foot brake pedal F. A pedal 22 is keyed onto this same shaft 19, via a further crank, and serves to recharge the device after it has actuated.

When the switch 12 of the dashboard is closed, and switch 8—9 closes, owing to the driver's loss of control, electro-magnet 13 is energized and the lever 16 oscillates in such a way as to disengage the tooth from the collar 18, thus enabling the shaft 19 to rotate and arm 21 to act on the tooth D of the foot brake, causing the vehicle to stop.

At the same time, in the case of engines of the ignition-spark type, the tie rod 25, secured to the panel 22, opens an electric switch 26 (FIG. 4) which is included in the ignition circuit 27 of the engine, thus shutting off the latter.

In the case of engines of the injection type, however, the tie rod 25 acts on a valve 28 (FIG. 5) designed to cut off the supply of fuel 29 to the engine.

After the device has acted, the shaft 19 can be returned to its initial position, the pedal 22 being depressed in order to cause the stepped collar 18 to engage the toothed lever 16. This operation also returns to its initial position the electric switch 26 of the ignition circuit or the valve 28 controlling the fuel feed as the case may be.

Without departing from the principle on which the invention is based, the constructional details and the forms in which it is put into practice can naturally undergo considerable variation by comparison with those described and illustrated purely by way of examples, without thereby deviating from the scope of the present invention.

I claim:

1. An automatic brake actuating device for vehicles of the kind having a steering wheel and a brake system operable by a control member, comprising a frame, bearings mounted on said frame, a shaft mounted in said bearings for rotation about its axis, spring means acting between said frame and said shaft, crank means on said shaft arranged to coact with the control member to operate said member and apply the brakes of the vehicle, a stepped collar on said shaft, a toothed lever movably mounted on the frame to engage on said stepped collar for releasably latching the shaft in loaded condition out of engagement with the control member, an electromagnetically operable shifting means coupled to said toothed lever and arranged when energized to shift said lever out of engagement with said stepped collar, a current source, and switch means having contacts arranged in circuit with the current source and shifting means, said switch means being loaded towards closing and disposed on the steering wheel for manual retention in open condition, a further crank on said shaft, a foot pedal at the outer end of said further crank, said further crank and foot pedal being arranged such that pressure against said foot pedal rotates the shaft in a direction against said spring means, a control device for stopping an internal combustion engine of the vehicle, and a coupling between said further crank and said control device, whereby rotation of the shaft to operate the control member for the brakes moves the further crank in a direction to actuate said control device to stop the internal combustion engine.

2. An automatic brake actuating device for vehicles of the kind having a steering wheel and a brake system operable by a control member, comprising a frame, bearings mounted on said frame, a shaft mounted in said bearings for rotation about its axis, spring means acting between said frame and said shaft, crank means on said shaft arranged to coact with the control member to operate said member and apply the brakes of the vehicle, a stepped collar on said shaft, a toothed lever movably mounted on the frame to engage on said stepped collar for releasably latching the shaft in loaded condition out of engagement with the control member, an electromagnetically operable shifting means coupled to said toothed lever and arranged when energized to shift said lever out of engagement with said stepped collar, a further crank on said shaft, a foot pedal at the outer end of said further crank, said further crank and foot pedal being arranged such that pressure against said foot pedal rotates the shaft in a direction against said spring means, and a coupling from said further crank to a switch arranged in the ignition circuit of an internal combustion engine of the vehicle, whereby rotation of the shaft to operate the control member for the brakes moves the further crank in a direction to open said ignition circuit switch, a current source, and switch means having contacts arranged in circuit with the current source and shifting means, said switch means being loaded towards closing and disposed on the steering wheel for manual retention in open condition.

3. An automatic brake actuating device for vehicles of the kind having a steering wheel and a brake system operable by a control member, comprising a frame, bearings mounted on said frame, a shaft mounted in said bearings for rotation about its axis, spring means acting between said frame and said shaft, crank means on said shaft arranged to coact with the control member to operate said member and apply the brakes of the vehicle, a stepped collar on said shaft, a toothed lever movably mounted on the frame to engage on said stepped collar for releasably latching the shaft in loaded condition out of engagement with the control member, an electromagnetically operable shifting means coupled to said toothed lever and arranged when energized to shift said lever out of engagement with said stepped collar, a further crank on said shaft, a foot pedal at the outer end of said further crank, said further crank and foot pedal being arranged such that pressure against said foot pedal rotates the shaft in a direction against said spring means, and a coupling from said further crank to a valve arranged in the fuel supply line of an internal combustion engine of the vehicle, whereby rotation of the shaft to operate the control member for the brakes moves the further crank in a direction to close said valve, a current source, and switch means having contacts arranged in circuit with the current source and shifting means, said switch means being loaded towards closing and disposed on the steering wheel for manual retention in open condition.

References Cited in the file of this patent

UNITED STATES PATENTS

| | | |
|---|---|---|
| 1,586,117 | Rich | May 25, 1926 |
| 1,650,272 | Hartmann | Nov. 22, 1927 |
| 2,296,003 | Loo | Sept. 15, 1942 |
| 2,385,982 | Gary | Oct. 5, 1945 |
| 2,568,482 | Blomberg | Sept. 18, 1951 |

FOREIGN PATENTS

| | | |
|---|---|---|
| 1,019,683 | Germany | Nov. 21, 1957 |